Feb. 18, 1936.    H. P. ECK ET AL    2,031,470
SAFETY CUTTING TOOL
Filed March 3, 1934    2 Sheets—Sheet 1

INVENTORS
HERBERT P. ECK
ISIDORE B. ROSENBERG
HARRY M. ROSENBERG
ISAAC FLEER.
BY
Ely & Pattison
ATTORNEYS

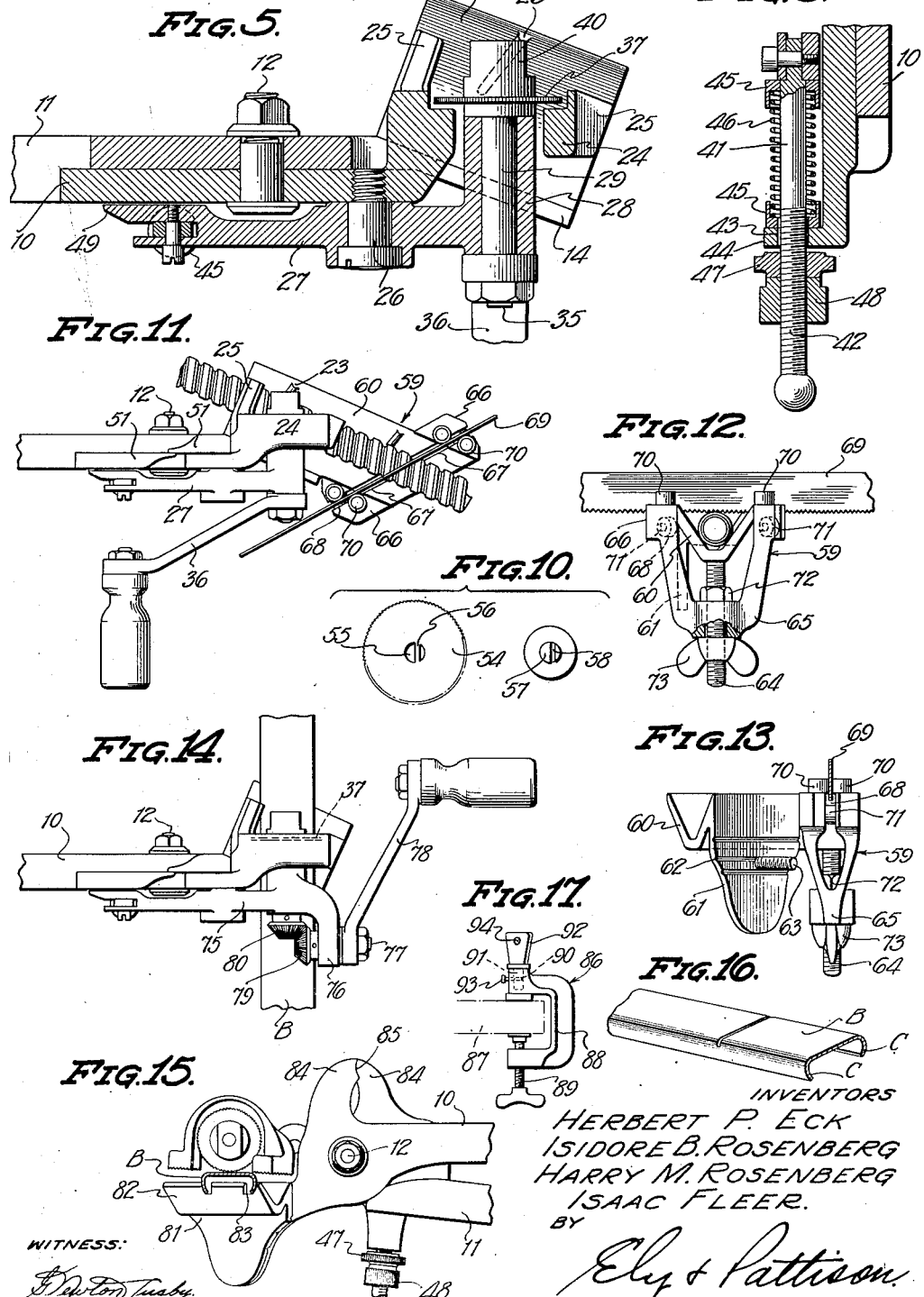

Patented Feb. 18, 1936

2,031,470

UNITED STATES PATENT OFFICE 2,031,470

SAFETY CUTTING TOOL

Herbert P. Eck, Isidore B. Rosenberg, and Harry M. Rosenberg, Portchester, and Isaac Fleer, New York, N. Y.

Application March 3, 1934, Serial No. 713,858

9 Claims. (Cl. 29—69)

This invention relates to improvements in cutting implements and more particularly to a portable hand tool for the cutting of BX cable, metallic moulding strips and the like.

While the invention is intended for use in the cutting of various articles, it is primarily adapted for use in the cutting of helically wound metallic cable known as BX cable. At present, it is the practice for electricians or other workmen in the cutting of BX cable to cut the same with a hack-saw, which often results in the cutting of the insulated conductor wires enclosed therein unbeknown to the operator and which subjects the wires to a short circuit when in use and endangers the premises on which the cable is installed by creating a fire hazard. Furthermore a workman experienced in the cutting of cable by means of a hack saw usually places the cable upon his knee for support, and many serious accidents result by reason of the accidental slipping of the cable, or saw during such practice.

It is therefore one of the main objects of the invention to provide a cutting implement to overcome the dangers above mentioned which embodies means for firmly gripping the cable during a cutting operation, a rotary cutter for rapidly cutting the cable, and a means for limiting the depth of cut of the rotary cutter.

Another object of the invention resides in the provision of a cutting tool which may be adjusted to compensate for the cutting of different size cables to respective predetermined depths.

A further object is the provision of a hand operated cutting tool which includes a rotary cutting wheel and means whereby the cutting wheel may only be positioned upon its shaft so that the angular cutting teeth of the wheel extend in the direction of operative rotation of the cutter wheel. This assures the correct positioning of the cutter wheel upon its shaft during replacement thereof, and thus prevents loss of time by inadvertently positioning the cutter wheel reversely upon its shaft and damage to the teeth if so operated.

A further object of the invention is to provide a cutting tool which may be held by one hand of an operator to clamp the work in position while the other hand is free to impart rotary movement to the cutter wheel.

A still further object is the provision of a cutting tool of the above character which may be carried in the kit of an electrician or other workman or used as a bench tool, and which is strong and durable to withstand the abuse to which such types of tools are subjected.

With these and other objects in view, the invention resides in the novel construction, combination and arrangement of parts, the essential features of which are pointed out in the following specification, are particularly pointed out in the appended claims and are illustrated in the accompanying drawings, in which, Figure 1 is a top plan view of the invention illustrating a length of BX cable positioned therein for cutting.

Figure 2 is a side elevational view thereof.

Figure 3 is a fragmentary side elevation looking at the side opposite to that shown in Figure 2.

Figure 4 is an enlarged vertical transverse sectional view on the line 4—4 of Figure 3 but showing the position of the parts after the cutter wheel has completed its cutting operation.

Figure 5 is an enlarged detail horizontal sectional view on the line 5—5 of Figure 2 but with the cable removed.

Figure 6 is a vertical sectional view on the line 6—6 of Figure 2.

Figure 7 is an end elevation of the cutter wheel shaft with the cutter wheel in operative position thereon.

Figure 8 is a detail perspective view of the cutter wheel shaft.

Figure 9 is a detail side elevational view of a length of BX cable cut by the cutting tool, the dotted lines indicating the manner in which the cut sections may be turned for separation.

Figure 10 is a detail collective elevational view of a modified form of shaft and cutter tool.

Figure 11 is a top plan view of the tool showing a modified form of work holder associated therewith.

Figure 12 is a front elevational view of the modified form of work holder separated from the tool.

Figure 13 is a side elevational view of the work holder shown in Figures 11 and 12.

Figure 14 is a top plan view of a modified form of tool employed for cutting metallic moulding strips.

Figure 15 is a side elevational view of the tool shown in Figure 14.

Figure 16 is a detail perspective view of a section of molding strip cut by the tool shown in Figures 14 and 15.

Figure 17 is a side elevational view of a holder by which the tool may be supported above a work bench.

Referring to the drawings wherein like reference characters designate like parts throughout the several modifications, the numerals 10 and 11 respectively designate a pair of elongated members pivotally connected together intermediate their ends in crossed scissor fashion as at 12. One of the ends of each member extends further beyond the pivot 12 and is curved outwardly to provide handles 13—13, while the opposite ends constitute the head ends and the same will now be described.

The head end of the lever 10 is formed with a flat angularly extending head 14, the top of which is straight and is disposed beneath the axis of the pivot 12. A vertically disposed elongated slot 15 is provided in the head 14 while the outer face of the head is provided with a series of predetermined spaced transversely disposed ribs or teeth 16 for a purpose to be presently explained.

Adjustably and removably carried by the angular head 14 is a work or cable support 17 which includes a V-shaped work rest 18 from one side of which a flat attaching plate 19 depends. The plate 19 is of the same shape and size of the angular head 14 and the outer face of the same is provided with a series of predeterminedly spaced grooves 20 corresponding in spacing to the ribs 16 but being of a greater number to facilitate the setting of the support 17 to accommodate the cutting of different standard size cable. For securing the support in an adjusted position, a threaded shank 21 fixed to the attaching plate 19 extends outwardly therefrom through the slot 15 and receives a thumb nut 22. A washer 23 surrounds the shank and is interposed between the thumb nut and the adjacent face of the flat head 14. If desired, the grooves 20 may be numbered to visibly indicate the settings of the work support for use in the cutting of various size armored cables, and by loosening the thumb nut, the work support may be readily adjusted to the desired setting and the thumb nut tightened to firmly hold the work support in set adjusted position. By reason of the fact that the plate 19 fits flat against the angular head 14, the longitudinal axis of the V-shaped rest 18 is at an angle relative to the length of the member 10 as best seen in Figure 1 of the drawings to support a length of armored BX cable A at such angle for cutting. A rib 23 is provided on the inside of the outer wall of the V-shaped rest 18 and extends from the top to the bottom of the said wall. The rib is disposed at an angle equal to that of the pitch of the convolutions of the cable A, and seats between the humps of the two adjacent convolutions to prevent longitudinal sliding of the cable during a cutting operation. The rib 23 is so arranged as to position the cable relative to the rotary cutter presently to be described.

The head end of the member 11 is formed with an arched guard 24 while extending outwardly at an angle therefrom to overlie the work support 18 are parallel feet or jaws 25, the underfaces of which are knurled. The jaws 25 extend respectively from opposite sides of the base of the arch guard as best seen in Figure 3 of the drawings.

Pivoted as at 26 to one side of the head end of the member 11 is a carrier rock lever 27, the forwardly extending end of which terminates in a bearing 28 which extends at right angles to the length of the lever and beneath the guard 24. A removable shaft 29 is rotatably supported in the bearing 28 and has a stop flange 30 adjacent one end thereof which abuts the outwardly projecting end of the bearing. The shaft beyond the flange 30 is provided with an eccentric key boss 31 having a relatively long flat side 32 and a shorter flat face 33 extending at right angle from the face 32. Extending beyond the key boss 31, the shaft terminates in a screw threaded stub 34 concentric to the axis of the shaft while the opposite end of the shaft likewise terminates in a threaded stub 35. Threaded to the stub 35 is the inner end of a crank handle 36 which is held fast against turning movement relative to the shaft 29 by a jamb nut 37 also threaded upon the stub 35 and bearing against the adjacent end of the bearing 28. Thus by grasping manually the crank handle and imparting turning movement thereto, the shaft 29 may be rotated.

While one specific construction of key means has been described above for the fastening of a cutter wheel 37 to its shaft, other constructions may be resorted to as will be apparent from a modification to be described hereafter. It is our desire to provide a key means between the shaft and the cutter wheel which prevents the mounting of the cutter wheel upon the shaft with the angular cutting teeth 38 of the cutter wheel facing in the wrong rotary cutting direction. Therefore, the cutter wheel 37 is provided with a straight offset opening 39 of a shape corresponding to the shape of the cam shaped key boss 31 as to snugly fit upon the boss as shown in Figure 7 with the teeth 38 facing in the direction of rotation illustrated by the arrow. Thus it will be seen that the cutter disk can only be applied from one of its sides and cannot be reversed which would tend to injure the teeth during an attempted cutting operation. Furthermore, it prevents loss of time on the part of the operator who might otherwise inadvertently insert the cutter wheel the wrong way upon the shaft.

After positioning the cutter wheel upon its key boss 31 a clamping nut 40 is threaded upon the threaded stub 34 and tightened to clamp the cutter wheel tight against the flange 30. The cutter wheel is thus disposed above the work rest 18 but on a plane at an angle to the longitudinal axis of said work rest as best seen in Figure 1.

For placing the rock lever 27 under a yielding action and for limiting the downward movement of the cutting wheel 37 to control the depth of the cut of the said cutting wheel, there is pivoted to the rearwardly extending end of the rock lever, the upper end of a rod 41, the lower end of the rod being screw threaded as at 42 and freely passing through an opening 43 in an outwardly extending lug 44, which lug is integral with the member 11. Interposed between seat collars 45 loosely mounted on the rod 41 and respectively abutting the lug 44 and lever 27 is an expansion coil spring 46, the said spring surrounding the rod. Threaded to the screw threaded portion 42 of the rod is a stop nut 47 which is engageable with the underside of the lug 44 for limiting the movement of the rod and lever against the action of the spring 46. By adjustment of the nut 47 along the rod, the movement of the rock lever may be predeterminedly set to limit the depth of the cutting movement of the cutter wheel 37. The stop nut 47 is secured in an adjusted position by a jamb nut 48 also threaded to the rod below the stop nut and which is turned to a position against the stop nut when in set position. By this construction, the cutter wheel may move upward as the lever 27 moves in a direction against the action of the spring 46, but is limited in its downward movement under the influence of the spring by the adjustable stop nut 47.

For facilitating accurate setting of the stop nut 47 to control the depth of the cut to be made by the cutter wheel, the rearwardly extending end of the rock lever 27 terminates in an indicating pointer 49 which coacts with a scale 50 arranged on the outer side face of the member 11. The graduations or readings of the scale 50 may be those of the different standard size armored cable which the tool is adapted to cut.

In practice, the work support 17 is adjusted relatively to the flat angular head 14 to receive an armored cable A of a particular cross sectional diameter. The rock lever 27 is also adjusted through the stop nut 47 to limit the depth of cut of the cutter wheel 37 for that particular size cable. Normally, that is, before a cable is placed in the work support and the handles 13—13 moved inwardly toward each other, the peripheral cutting edge of the cutter wheel extends below the plane of the gripping faces of the jaws 25 by reason of the action of the spring 46. The distance between the lower peripheral cutting edge of the cutter wheel and the plane of the gripping faces of the jaws 25 determines the depth of the cut to be made as will be seen by reference to Figure 4, and which distance may be accurately obtained by manipulating the adjustable stop nut 47 to set the pointer 49 of the rock lever 27 on the correct marking of the dial 50.

Assume that the tool has been set in the manner above described and it is desired to cut a length of BX cable. The handles 13—13 are spread apart and the head end of the tool is brought up to the cable to be cut, the cable extending lengthwise of the V-shaped work rest 18 with the rib 23 seated in a valley or groove between two adjacent convolutions to prevent slipping of the tool or cable relative to each other when the cable is clamped and during a cutting operation. After the cable has been positioned in the work holder the operator grasping both handles 13—13 in one hand, imparts a squeezing force thereto similar to the gripping action of a pair of pliers. This movement of the members 10 and 11 causes the head ends thereof to move toward each other whereupon the cutting periphery of the cutter wheel 37 will be moved into contact with the cable, and by reason of the location of the rib 23, the edge of the cutter wheel will engage the adjacent sides of two convolutions of the cable and bridge the valley or gap therebetween. Continued movement of the head ends of the members 10 and 11 will cause the cutter wheel to yield through the action of the rock lever 27 and spring 46 until the gripping faces of the jaws 25—25 engage the cable and coact with the work rest 18 to securely grip the same. When the cable is thus gripped, the cutter wheel 37 is disposed at an angle to the longitudinal axis of the cable as best seen in Figure 1 of the drawings. The operator while tightly gripping the handles 13—13 with one hand also grasps the manipulating crank handle 36 with the other hand and imparts a turning movement thereto which likewise rotates the cutter wheel 37 which is in bearing contact with the cable. As the cutter wheel cuts through the cable, the wheel is automatically fed inwardly by the action of the spring 46 and the centrifugal force imparted to the cutter wheel by the turning of the crank until one complete convolution of the cable is cut, the further movement of the cutter wheel being limited by the stop nut 47 striking against the lug 44. The operator is aware at the end of a cutting operation as the feel of the handle during turning thereof reveals that the cutter wheel is idling and has completed its function. The handles 13—13 may now be spread apart to release the grip upon the cable and lift the cutter wheel from the slot cut thereby. The cut produced by the cutter wheel is illustrated in Figure 9, whereupon a turning movement of one of the cut sections of the cable relative to the other as illustrated in dotted lines will cause the complete separation of said sections.

In electrical wiring it is the practice to pass insulated conductor wires through BX cable and after cutting the armor, it is sometimes necessary to cut the wires housed therein. In order to facilitate the cutting of the wires by the use of the same tool, a pair of coacting blades 51 are formed on the top of the members 10 and 11 adjacent the axis of the pivot 12. The cutting edges 52 of the blades are concave while the extreme free ends are rounded as at 53, so that the blades lap inwardly during their closing movement. The blades are opened by a spreading apart of the handles 13—13 to receive the wire to be cut, and by squeezing inwardly upon said handles, the blades move close and produce a shearing action.

In Figure 10 of the drawings, there is shown a modified form for keying the cutter wheel upon its shaft. The cutter wheel 54 is provided with a central opening 55 concentric with respect to the axis of the wheel while bridging the opening and offset with respect to its center is a key 56. The shaft 57 has one of its ends slotted inwardly as at 58, the slot being offset relative to the axis of the shaft to correspond to and receive the offset key 56.

There may be times when it is necessary to cut a length of BX cable by means of a hack saw, such as in instances where the cutter wheel has become dull and a replacement is unavailable. For this reason, there is provided a hack saw miter attachment 59 shown in Figures 11 to 13 inclusive which may be substituted for the work support 17. The attachment 59 includes a V-shaped work rest 60 from one side of which an attaching plate 61 depends, the outer side of which is provided with spaced transversely extending grooves 62 to receive the teeth 16 of the angular head 14. A threaded shank 63 extends outwardly from the plate 61 and serves the same function as the shank 21. Depending from the bottom of the work rest 60 adjacent the outer end thereof is a threaded stem 64 on which an adjustable substantially U-shaped saw gauge frame 65 is slidably mounted. The upstanding arms 66 of the frame embrace opposite sides of the work rest 60 and are disposed at an angle to the longitudinal axis of the work rest as best seen in Figure 11. The downwardly converging walls of the V-shaped work rest 60 are slotted downwardly from the top as at 67 while the tops of the arms 66 are likewise slotted as at 68 and in alinement therewith to provide a miter slot for the hack saw 69. The tops of the arms 66 are provided with saw guide rollers 70 while journaled in the arms and disposed within the slots 68 are guard rollers 71, the said guard rollers 71 being in the path of downward cut of the saw for limiting the depth of the cut of the saw 69. The frame 59 is held in various positions of adjustment to vary the depth of the cut of the hack saw by means of a stop nut 72 threaded on the stem 64 and a clamping thumb nut 73 also threaded upon the said stem. These nuts 72 and 73 clamp the base of the frame 59 therebetween. The forward end of the miter attachment extends a sufficient distance forward of the tool to prevent interference of the reciprocatory movement of the saw during a cutting operation. By reference to Figure 11, it will be apparent that the line of cut of the saw 69 is at an angle with respect to the axis of the cable to be cut and after the saw has cut a full convolution to the limit of its depth, the cut sections of the cable are free to be turned and separated.

In Figures 14 and 15 of the drawings, there is shown a further modified form wherein the tool may be rendered adaptable for use in the cutting of metallic channel strips used to conceal electric wires extending about the wall of a room. In this form, the tool is substantially the same as that described in the preferred embodiment of the invention with the exception that a rock lever 75 is substituted for the rock lever 27. The rock lever 75 is substantially the same as the rock lever 27 with the exception that it is provided with a right angularly extending bearing arm 76 which acts as a bearing for a stub shaft 77. One end of the stub shaft 77 has a crank handle 78 fixedly connected thereto, while the other or inwardly extending end of said stub shaft carries a bevel pinion gear 79 which has constant meshing engagement with a bevel pinion gear 80 fixed to one end of the cutter wheel shaft. This arrangement is necessary to dispose the crank handle beyond the path of the work or channel B to be cut.

The cutting of the channel B also necessitates a slightly different construction of work holder 81 which is substantially identical to the work holder 17 in the preferred form, with the exception that the tops of the downwardly converging walls of the work rest 82 are provided with oppositely disposed spaced notches 83 which are adapted to receive the inwardly curved flanges C of the channel strip B as best illustrated in Figure 15. The notches 83 are so arranged that when the channel B is in position for cutting, the channel extends at right angles to the line of cut produced by the cutter wheel 37.

In operation, the metal strip B is placed with its open face down upon the work rest 82, with the flanges C seated in the notches 83, thus presenting a flat side of the channel upwardly to be engaged by the cutter wheel 37 when the manipulating handles are moved toward each other. The channel strip is now held gripped and by rotating the crank handle 78, rotary movement will be imparted through the meshing gears 79 and 80 to the cutter wheel 37, which wheel will cut a slot transversely of the channel to a depth short of the edges of the flanges C, and as illustrated in Figure 16. This cut will facilitate the bending of the channel strip if a bend is needed, and in the event that it is desired to completely cut the strip B, the uncut portion may be severed by the cutting blades 84 which are similar to the cutting blades of the preferred form, with the exception that the tip ends of the blades are concave as at 85 instead of rounded or convex as hereinbefore shown and described. The concaved portion 85 of the cutting blades produces a cut which is coextensive with the cut produced by the rotary cutter.

In Figure 17 of the drawings there is shown a holder 86 for use in supporting the cutting tool in a position upon a work bench or table 87. The holder 86 includes a C-shaped clamp 88, the lower arm of which carries a clamping screw 89 while the upper arm constitutes a jaw whereby the holder may be fixedly clamped to the edge of the bench or table. The upper arm of the clamp 88 is provided with a socket 90 in which the shank 91 of a carrier member 92 extends. A set screw 93 is provided for securing the carrier member 92 in various positions of adjustment. The top of the carrier member 92 is flat and is provided with an opening 94 to receive the shank 21 shown in the preferred form by first removing the thumb nut 22 and then replacing the thumb nut to securely clamp the tool to the carrier member 92. This holder will be found useful in use of the tool upon a bench or table as it supports the weight of the tool during operation thereof.

While we have shown and described what we consider to be the most practical embodiments of our invention, it will be understood that various changes and modifications may be resorted to as come within the scope of the appended claims.

Having thus described the invention, what we claim as new and what we desire to secure by Letters Patent of the United States is:

1. A cutting tool including a pair of pivotally connected members having handle portions at their free ends, a clamping jaw integral with and disposed at the other end of one of said members, a rock lever pivoted on the same end of said member, a cutter wheel journaled in the outer end of said pivoted rock lever for swinging movement above and below the clamping face of said clamping jaw, an indicating pointer on the inner end of said rock lever, a graduated scale on the outer side of the member on which said rock lever is mounted with which said pointer coacts, handle operated means for rotating said cutter wheel, and a work support carried by the other end of the other of said members.

2. A cutting tool including a pair of pivotally connected members having handle portions at one of their ends, a clamping jaw provided on the other end of one of said members, a work support carried by the other end of the other of said members, means for setting said work support relative to said jaw to facilitate the clamping of different size work, a rotary cutter wheel, means for yieldably supporting said cutter wheel on one of said members for movement relative to said jaw and work support, and handle operated means for rotating said cutter wheel.

3. In a cutting tool, a rotatable shaft having an operative direction of rotation, a relatively thin cutter wheel having angular teeth on the periphery thereof extending in the direction of operative rotation of said shaft, and cooperative key means between said shaft and said wheel which prevents the positioning of said cutter wheel upon said shaft in any way except with the angular teeth extending in the direction of operative rotation of said shaft, said cooperative key means including an eccentric boss provided on said shaft, two meeting flat angular surfaces of different lengths on said boss said boss being received in a corresponding shaped opening provided in said cutter wheel, the axes of which shaft and said cutter wheel being in alinement.

4. A cutting tool including a pair of pivotally connected members having handle portions at one of their ends, cooperating work gripping jaws on the other ends of said members, a rock lever pivoted at the outer side of one of said members, a rotary cutter wheel journaled in the outer end of said rock lever for cutting a piece of work held by said work gripping jaws, a lug extending outwardly from the member on which said rock lever is mounted, a rod having one of its ends pivoted to the inner end of said rock lever and its other end slidably extending through said lug, and a spring surrounding said rod and interposed between said rock lever and said lug to place a tension upon said rock lever.

5. A cutting tool including a pair of pivotally connected members having handle portions at one of their ends, cooperating work gripping jaws on the other ends of said members, a rock lever pivoted at the outer side of one of said members, a rotary cutter wheel journaled in the outer end of said rock lever for cutting a piece of work held by said work gripping jaws, a lug extending outwardly from the member on which said rock lever is mounted, a rod having one of its ends pivoted to the inner end of said rock lever and its other end slidably extending through said lug, and a spring surrounding said rod and interposed between said rock lever and said lug to place a tension upon said rock lever, and an adjustable stop member threaded on the free end of said rod for engagement with said lug to limit movement of said rock lever against the tension of said spring.

6. A cutting tool including a pair of pivotally connected elongated members having handle portions at one of their adjacent ends, an arch-shaped head provided on the opposite end of one of said members and constituting a rotary cutter guard, gripping jaws extending from the arch-shaped head, a gripping jaw provided on the adjacent end of the other of said members, and a rotary cutter wheel yieldably mounted upon the member having the arch-shaped head and which is disposed therein whereby actuation of the handle portions of said members will cause said cutter wheel to move into engagement with a piece of work held by said gripping jaws.

7. In a BX cable cutting tool, a work support including a V-shaped work rest, means for clamping a length of BX cable down within said work rest lengthwise thereof, a rib provided on the inside of one of the angular walls of said V-shaped work rest, said rib extending at an angle substantially equal to the pitch of the convolutions of the BX cable to be cut, and saw means disposed at an angle to the longitudinal axis of said V-shaped work rest and overlying the same to cut through one convolution of the cable to be cut.

8. In a cutting tool, a rotatable shaft having an operative direction of rotation, a cutter wheel having angular teeth on the periphery thereof extending in the direction of operative rotation of said shaft, said cutter wheel having an opening therein of a uniform cross section throughout its length, and cooperative key means between said shaft and the walls of the opening in said wheel which prevent the positioning of said cutter wheel upon said shaft in any way except with the angular teeth extending in the direction of operative rotation of said shaft.

9. A cutting tool including a pair of pivotally connected members having handle portions at one of their ends, a clamping jaw carried by and disposed at the other end of one of said members, a pivoted rock lever on the same end of said member, a cutter wheel journaled in the outer end of said rock lever for swinging movement above and below the clamping face of said clamping jaw, a spring acting upon the other end of said rock lever to normally urge the cutter wheel into engagement with the work to be cut, a work support carried by the other end of the other of said members, and means for imparting rotation to said cutter wheel.

HERBERT P. ECK.
ISIDORE B. ROSENBERG.
HARRY M. ROSENBERG.
ISAAC FLEER.